(12) United States Patent
Graham et al.

(10) Patent No.: US 10,695,865 B2
(45) Date of Patent: Jun. 30, 2020

(54) SYSTEMS AND METHODS FOR FABRICATING A COMPONENT WITH AT LEAST ONE LASER DEVICE

(71) Applicant: General Electric Company, Schenectady, NY (US)

(72) Inventors: Michael Evans Graham, Slingerlands, NY (US); Lang Yuan, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 477 days.

(21) Appl. No.: 15/449,536

(22) Filed: Mar. 3, 2017

(65) Prior Publication Data
US 2018/0250770 A1 Sep. 6, 2018

(51) Int. Cl.
*B23K 26/02* (2014.01)
*B23K 26/08* (2014.01)
(Continued)

(52) U.S. Cl.
CPC .......... *B23K 26/342* (2015.10); *B22F 3/1055* (2013.01); *B23K 26/0006* (2013.01);
(Continued)

(58) Field of Classification Search
CPC ............... B23K 26/025; B23K 26/035; B23K 26/08–082; B23K 26/34–342; B23K 26/354
See application file for complete search history.

(56) References Cited

U.S. PATENT DOCUMENTS

| 5,104,592 A | 4/1992 | Hull et al. |
| 5,130,064 A | 7/1992 | Smalley et al. |

(Continued)

FOREIGN PATENT DOCUMENTS

| CN | 105252774 A1 | 1/2016 |
| CN | 105492188 | 4/2016 |

(Continued)

OTHER PUBLICATIONS

K. Al-Manasir, "A fully automatic registration method for laser scanner data", Radar Conference 2013, IET International, pp. 1-6, Apr. 14-16, 2013.

(Continued)

*Primary Examiner* — Michael A LaFlame, Jr.
(74) *Attorney, Agent, or Firm* — Armstrong Teasdale LLP

(57) ABSTRACT

A controller for use in an additive manufacturing system including at least one laser device configured to generate at least one melt pool in powdered material including a processing device and a memory device. The controller is configured to generate at least one control signal to control a power output of the at least one laser device throughout at least one scan path across the layer of powdered material, the scan path generated at least partially based on a functional relationship between a plurality of points of a generating path and each point of a plurality of points of the scan path. The controller is further configured to generate a non-uniform energy intensity profile for the scan path, and transmit the control signal to the laser device to emit at least one laser beam to generate at least one melt pool.

20 Claims, 7 Drawing Sheets

(51) Int. Cl.

| | |
|---|---|
| *B23K 26/34* | (2014.01) |
| *B23K 26/342* | (2014.01) |
| *B23K 26/06* | (2014.01) |
| *B33Y 10/00* | (2015.01) |
| *B33Y 30/00* | (2015.01) |
| *B33Y 50/02* | (2015.01) |
| *B23K 26/082* | (2014.01) |
| *B29C 64/393* | (2017.01) |
| *B29C 64/268* | (2017.01) |
| *B23K 26/00* | (2014.01) |
| *B22F 3/105* | (2006.01) |
| *B23K 26/03* | (2006.01) |

(52) U.S. Cl.
 CPC ........ *B23K 26/032* (2013.01); *B23K 26/0608* (2013.01); *B23K 26/0626* (2013.01); *B23K 26/082* (2015.10); *B29C 64/268* (2017.08); *B29C 64/393* (2017.08); *B33Y 10/00* (2014.12); *B33Y 30/00* (2014.12); *B33Y 50/02* (2014.12); *B22F 2003/1057* (2013.01); *Y02P 10/295* (2015.11)

(56) References Cited

U.S. PATENT DOCUMENTS

| | | | |
|---|---|---|---|
| 5,639,070 | A | 6/1997 | Deckard |
| 5,932,059 | A | 8/1999 | Langer et al. |
| 6,399,010 | B1 | 6/2002 | Guertin et al. |
| 6,676,892 | B2 | 1/2004 | Das et al. |
| 6,699,424 | B2 | 3/2004 | Nguyen et al. |
| 7,569,174 | B2 | 8/2009 | Ruatta et al. |
| 8,034,279 | B2 | 10/2011 | Dimter et al. |
| 9,073,265 | B2 | 7/2015 | Snis |
| 9,358,635 | B2 | 6/2016 | Bruck |
| 2014/0154088 | A1 | 6/2014 | Etter et al. |
| 2014/0271328 | A1* | 9/2014 | Burris .................. B23K 26/034 419/53 |
| 2015/0034604 | A1 | 2/2015 | Subramanian et al. |
| 2016/0059352 | A1* | 3/2016 | Sparks .................. B33Y 30/00 219/76.14 |
| 2016/0279707 | A1* | 9/2016 | Mattes .................. B33Y 30/00 |
| 2017/0197278 | A1* | 7/2017 | Garry .................... B33Y 10/00 |

FOREIGN PATENT DOCUMENTS

| | | |
|---|---|---|
| DE | 10042134 A1 | 3/2002 |
| EP | 2 514 553 A2 | 10/2012 |
| EP | 3 345 698 A1 | 7/2018 |
| JP | 2014500147 A | 1/2014 |
| JP | 2016507377 A | 3/2016 |
| WO | 2016062714 A1 | 4/2016 |
| WO | 2016/201326 A1 | 12/2016 |
| WO | 2017/201120 A1 | 11/2017 |
| WO | 2018/022429 A1 | 2/2018 |

OTHER PUBLICATIONS

Hu et al., "Registration of Multiple Laser Scans Based on 3D Contour Features", Tenth International Conference on Information Visualisation (IV'06), pp. 725-730, Jul. 5-7, 2006.

Zhang et al., "Study on Scanning Pattern during Laser Metal Deposition Shaping", ICICTA '09 Proceedings of the 2009 Second International Conference on Intelligent Computation Technology and Automation—vol. 4, pp. 668-671, Oct. 10-11, 2009.

Extended European Search Report and Opinion issued in connection with corresponding EP Application No. 18158835.1 dated Aug. 2, 2018.

\* cited by examiner

SYSTEMS AND METHODS FOR FABRICATING A COMPONENT WITH AT LEAST ONE LASER DEVICE

BACKGROUND

The subject matter disclosed herein relates generally to additive manufacturing systems and, more particularly, to methods and systems for fabricating a component using at least one laser device generating a non-uniform energy intensity profile along scan paths generated at least partially based on a functional relationship between a generating path and each point of a plurality of points of each scan path.

At least some additive manufacturing systems involve the buildup of a particulate material to make a component. This method facilitates producing complex components from expensive materials at a reduced cost and with improved manufacturing efficiency. At least some known additive manufacturing systems, such as Direct Metal Laser Melting (DMLM), Selective Laser Sintering (SLS), Direct Metal Laser Sintering (DMLS) and LaserCusing systems, fabricate components using a focused energy source, such as a laser device or an electron beam generator, a build platform, and a particulate, such as, without limitation, a powdered metal. The focused energy source device melts the particulate material on the build platform in and around the area where the focused energy source is incident on the particulate material, resulting in at least one melt pool. Each melt pool cools and forms at least a portion of the next layer in the build process.

In systems like DMLM, the laser beam or electron beam is used to scan a layer of powder to sinter and melt the desired pattern in the layers of the powder bed. The typical scanning time for such systems per layer is in the range of 70-100 seconds. For certain parts, the build time requires days of processing time. The time required to scan a component per layer prevents significant cost benefits associated with additive manufacturing from being fully realized. Another problem of DMLM systems is rapid, and sometimes inconsistent, cooling rates that result in the temperature of some portions of the component falling below a required minimum temperature.

BRIEF DESCRIPTION

In one aspect, a controller for use in an additive manufacturing system including at least one laser device is provided. The at least one laser device is configured to generate at least one melt pool in a layer of powdered material. The controller includes a processing device and a memory device coupled to the processing device. The controller is configured to generate at least one control signal to control a power output throughout at least one scan path of the at least one laser device across the layer of powdered material, the at least one scan path generated at least partially based on a functional relationship between a plurality of points of a generating path and each point of a plurality of points of the at least one scan path. The controller is further configured to generate a non-uniform energy intensity profile for the at least one scan path of the at least one laser device, wherein the non-uniform energy intensity profile facilitates generating the at least one melt pool having at least one predetermined characteristic, and to transmit the at least one control signal to the at least one laser device to emit at least one laser beam to generate the at least one melt pool.

In another aspect, an additive manufacturing system is provided. The additive manufacturing system includes at least one laser device, an actuator system, and a controller. The at least one laser device is configured to generate at least one melt pool in a layer of powdered metal. The actuator system is configured to move the at least one laser device across the layer of powdered material. The controller is configured to generate at least one control signal to control a power output throughout at least one scan path of the at least one laser device across the layer of powdered material, the at least one scan path generated at least partially based on a functional relationship between a plurality of points of a generating path and each point of a plurality of points of the at least one scan path. The controller is further configured to generate a non-uniform energy intensity profile for the at least one scan path of the at least one laser device, wherein the non-uniform energy intensity profile facilitates generating the at least one melt pool having at least one predetermined characteristic. The controller is further configured to transmit the at least one control signal to the at least one laser device to emit at least one laser beam to generate the at least one melt pool.

In yet another aspect, a method of fabricating a component in a powder bed is provided. The method includes generating at least one scan path for at least one laser device, the at least one scan path generated at least partially based on a functional relationship between each point of a plurality of points of the at least one scan path and a plurality of points of a generating path. The method further includes generating a non-uniform energy intensity profile facilitating generating at least one melt pool having at least one predetermined characteristic. The method also includes moving the at least one laser device across the powder bed. The method further includes controlling a scan path of the at least one laser device. The method also includes controlling a power output of the at least one laser device. The method further includes emitting at least one energy beam from the at least one laser device to generate at least one melt pool.

DRAWINGS

These and other features, aspects, and advantages of the present disclosure will become better understood when the following detailed description is read with reference to the accompanying drawings in which like characters represent like parts throughout the drawings, wherein.

Figure 1:
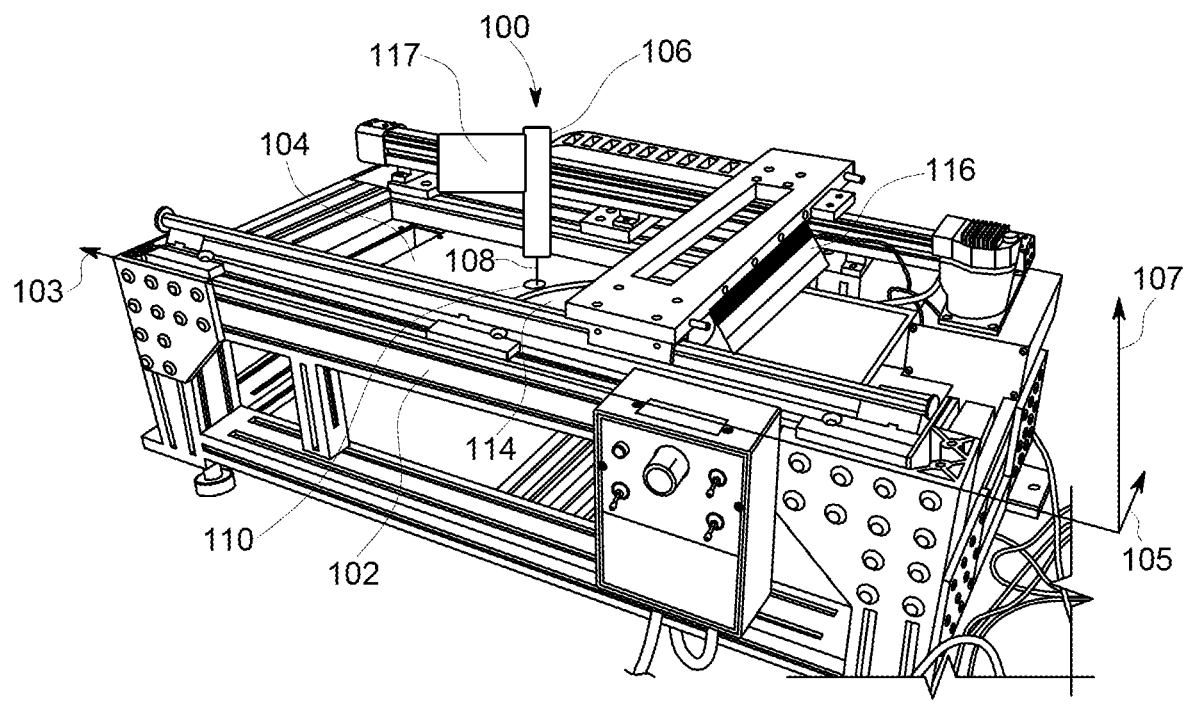
FIG. 1 is a perspective schematic view of an exemplary additive manufacturing system.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer," and related terms, e.g., "processing device," "computing device," and "controller" are not limited to just those integrated circuits referred to in the art as a computer, but broadly refers to a microcontroller, a microcomputer, a programmable logic controller (PLC), and application specific integrated circuit, and other programmable circuits, and these terms are used interchangeably herein. In the embodiments described herein, memory may include, but it not limited to, a computer-readable medium, such as a random access memory (RAM), a computer-readable non-volatile medium, such as a flash memory. Alternatively, a floppy disk, a compact disc—read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method of technology for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including without limitation, volatile and non-volatile media, and removable and non-removable media such as firmware, physical and virtual storage, CD-ROMS, DVDs, and any other digital source such as a network or the Internet, as well as yet to be developed digital means, with the sole exception being transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

Embodiments of the additive manufacturing systems with multiple lasers generating a non-uniform energy intensity profile along scan paths generated by an algorithm defining a functional relationship are described herein. The additive manufacturing system includes a focused energy source being swept across a component surface in a relationship to a generating path to fabricate the component from particulate material.

The systems and methods described herein facilitate independently controlling individual lasers to generate a non-uniform energy intensity profile along a scan path assigned across a section of a component in a powder bed. Specifically, in one embodiment, an additive manufacturing system having at least one individually controllable laser whose scan path is controlled by a functional relationship with a single generating path is described and is used to rapidly and efficiently create components in the additive manufacturing process. A control system adjusts the output power of each laser individually in conjunction with following a set of generating points comprising a member scan curve generated through an algorithm defining a functional relationship with a generating curve. In one embodiment, to create a set of scan paths, a set of generating points in a functional relationship with each other is swept along a generating path that has been assigned across a section of the component being built. In another embodiment, scan paths are created directly from a functional relationship with a generating path.

The control system adjusts the output power of each laser individually as it travels along its respective scan path to facilitate generating unique scan attributes throughout scanning of the component. The non-uniform energy intensity profile facilitates reacting to differing thermal loss rates and non-uniform laser scan speeds to generate consistency in the desired scan attributes. For example, the control system adjusts the output power and follows a set of generating points in a scan path defined for each individual laser device in a group of laser devices to efficiently and dynamically alter characteristics of each melt pool depending on the geometry of the component being scanned.

In operation, control of the additive manufacturing system includes using build parameters from a three dimensional (3D) computer model to fabricate a component. Each laser of the additive manufacturing system heats a powdered metal to form at least one melt pool. A controller coupled to the additive manufacturing machine controls operation of each laser and/or the powder bed to guide the output of each laser, and thereby each resulting melt pool, along a predetermined scan path in the powdered metal. As each laser traverses each predetermined scan path, each melt pool cools, forming a hardened metal structure.

In one embodiment, each laser device receives an independent control signal configured to direct the laser device along a scan path generated from an algorithm defining a functional relationship with a single generating path. In the same embodiment, each laser device also receives an independent control signal to adjust an amount of output power. The independent control signals vary to control the output power of each laser as it is traversed across the build platform, each laser device following its respective scan path, i.e., based on the absolute position of each laser device. The non-uniform energy intensity profile is adjustable to generate scan attributes, such as, for example, consistent melting depth and or size. For example, and without limitation, the non-uniform energy intensity profile is adjustable to include increased power for laser devices at the distal end of a grouping and decreased power for laser devices in the central region of a grouping of lasers to compensate for differences in thermal losses across the powder bed. The non-uniform energy intensity profile is also adjustable by turning on or off laser devices within the additive manufacturing system.

In another embodiment, a power gradient may be applied to each laser to compensate for differences in the velocity of each laser while making turns or while following other complex geometries. In addition, in some embodiments, each laser may be of a type that includes various laser devices that differ in power, spot size, and/or wavelength to facilitate generating desired non-uniform energy intensity profiles.

Figure 2:
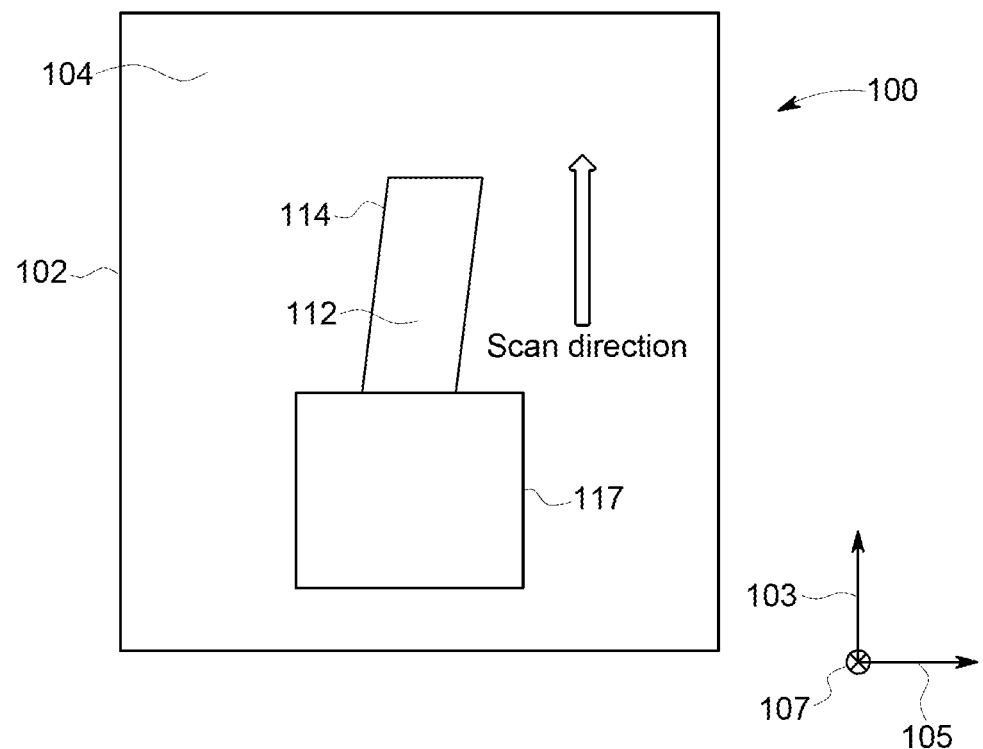
FIG. 2 is a schematic view of the additive manufacturing system shown in FIG. 1, looking down on a powder bed.

FIG. 1 is a perspective view of an exemplary additive manufacturing system 100. FIG. 2 is a schematic view of additive manufacturing system 100 looking down on a powder bed 204. In the exemplary embodiment, additive manufacturing system 100 is a direct metal laser melting (DMLM) system. In alternative embodiments, additive manufacturing system 100 is configured for use for any additive manufacturing process that facilitates operation of additive manufacturing system 100 as described herein. For example, in some embodiments, additive manufacturing system 100 is used for any of the following processes: Selective Laser Sintering (SLS), Direct Metal Laser Sintering (DMLS), Selective Laser Melting (SLM) and LaserCusing. In the exemplary embodiment, additive manufacturing system 100 includes a build platform 102, a powder bed 104, an energy source 106, an energy beam 108, at least one melt pool 110, a build layer 112, a component 114, a recoating device 116, and a housing 117 that contains components of additive manufacturing system 100. A longitudinal axis 103 of additive manufacturing system 100 extends through additive manufacturing system 100 in the direction of travel of recoating device 116. A transverse axis 105 extends in a plane substantially parallel to build platform 102 and normal to longitudinal axis 103. A vertical axis 107 extends in a direction that is normal to longitudinal axis 103 and normal to transverse axis 105. Longitudinal axis 103, transverse axis 105, and vertical axis 107 are orthogonal to each other.

Figure 3:
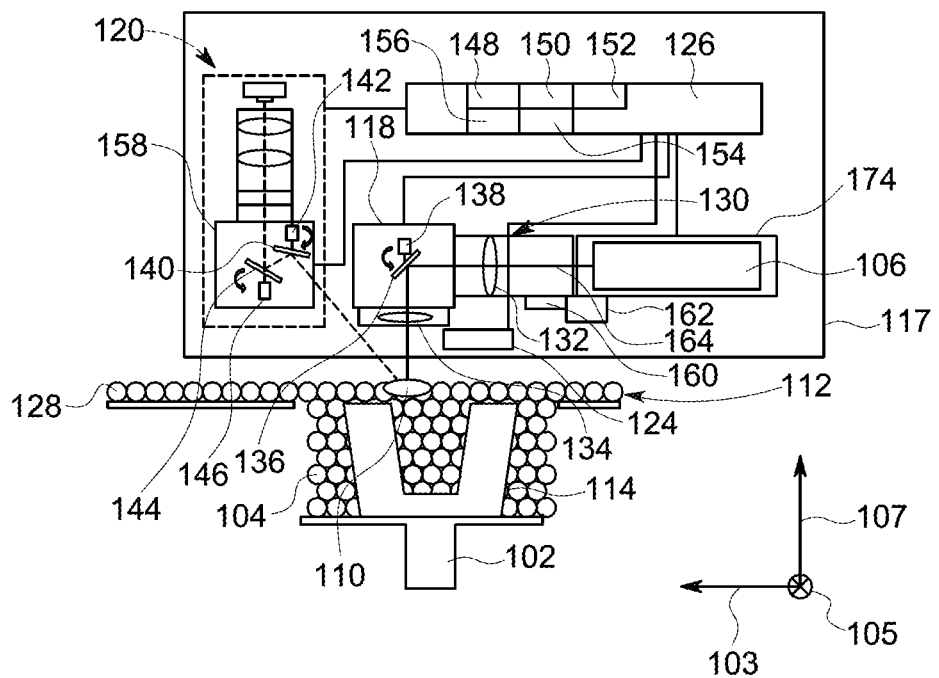
FIG. 3 is a schematic view of the additive manufacturing system shown in FIG. 1.

FIG. 3 is a schematic view of additive manufacturing system 100 utilizing at least one laser beam. In the exemplary embodiment, additive manufacturing system 100 includes a focused energy source 106, optical elements 130, a first scanning device 118, a second scanning device 158, housing 117, an optical system 120, recoating device 116, a particulate delivery system 124, and a controller 126. In alternative embodiments, additive manufacturing system 100 includes any component in any quantity that facilitates operation of additive manufacturing system 100 as described herein. Additionally, in the exemplary embodiment, build platform 102 defines a powder bed 104 configured to hold particulates 128. In alternative embodiments, powder bed 104 is configured to have an atmosphere of argon. However, powder bed 104 may have an atmosphere of any inert gas which enables manufacturing system 100 to operate as described herein.

Also, in the exemplary embodiment, housing 117 provides a controlled environment for housing components of additive manufacturing system 100 such as particulate delivery system 124. Particulate delivery system 124 includes a dispenser 160 and a particulate supply 162. At least a portion of particulate delivery system 124 is enclosed within housing 117. In particular, dispenser 160 and particulate supply 162 are positioned within the controlled environment of housing 117 to inhibit exposure of particulates 128 to the ambient environment. In alternative embodiments, particulate delivery system 124 is positioned anywhere in additive manufacturing system 100 that facilitates additive manufacturing system 100 operating as described herein. In alternative embodiments, additive manufacturing system 100 includes any housing 117 that facilitates additive manufacturing system 100 operating as described herein.

In addition, in the exemplary embodiment, particulates 128 are powdered build materials that are melted and re-solidified during the additive manufacturing process to build a solid component. In the exemplary embodiment, particulates 128 include a gas-atomized alloy of any of the following: cobalt, iron, aluminum, titanium, nickel, and combinations thereof. In alternative embodiments, particulates 128 include any material that facilitates the operation of additive manufacturing system 100 as described herein. For example, in some embodiments, particulates 128 include, without limitation, any of the following: ceramic powders, metal-coated ceramic powders, thermoset resins, and thermoplastic resins. In further embodiments, additive manufacturing system 100 utilizes any number of particulates, e.g., first, second, third particulates, fourth particulates, etc.

In the exemplary embodiment, dispenser 160 is positioned above powder bed 104 and configured to deposit particulates 128 onto powder bed 104. In particular, dispenser 160 is coupled to particulate supply 162 and configured to dispense particulates 128 from particulate supply 162 onto powder bed 104. Accordingly, dispenser 160 facilitates depositing particulates 128 onto powder bed 104. In alternative embodiments, additive manufacturing system 100 includes any dispenser that facilitates the operation of additive manufacturing system 100 as described herein. For example, in some embodiments, particulate delivery system 124 includes a powder bed and a transfer mechanism to deposit at least the particulates 128 onto surface powder bed 104.

At least a portion of particulate delivery system 124 is configured to move relative to powder bed 104. In particular, particulate dispenser 160 is configured to move longitudinally relative to powder bed 104. In addition, particulate dispenser 160 is configured to move towards and away from powder bed 104. Accordingly, particulate delivery system 124 is configured to deposit at least particulates 128 in any pattern on powder bed 104. In alternative embodiments, particulate delivery system 124 is configured to move in any manner that facilitates the operation of additive manufacturing system 100 as described herein.

Figure 4:
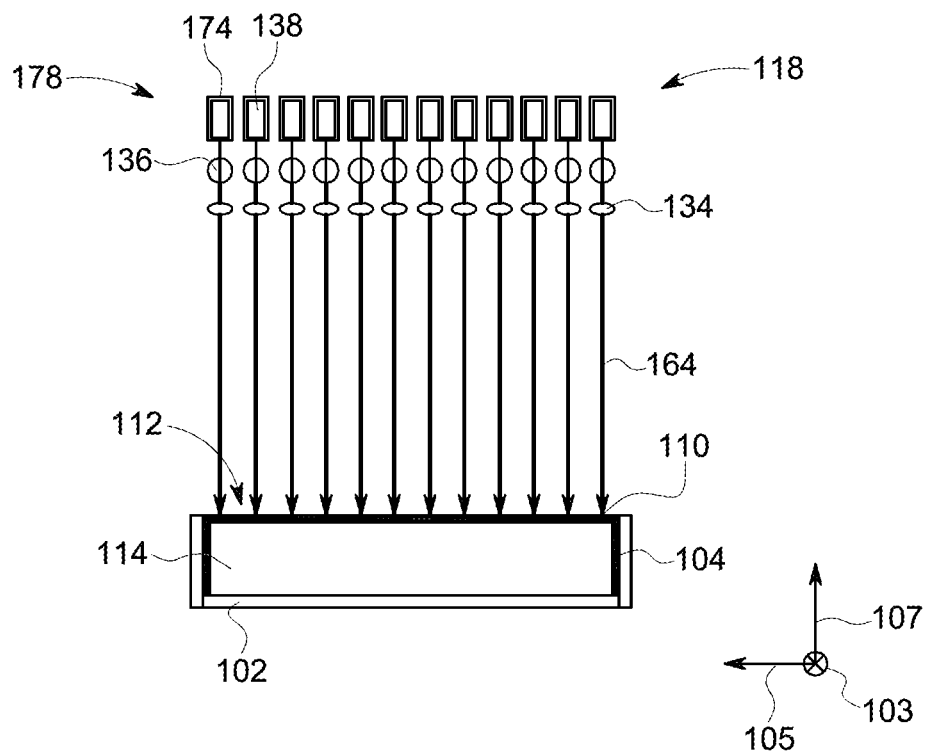
FIG. 4 is a schematic of an exemplary laser group for use with the additive manufacturing system shown in FIG. 1

FIG. 4 is a schematic of an exemplary laser group 178 for use with additive manufacturing system 100 (shown in FIGS. 1-3). In the exemplary embodiment, laser group 178 includes the plurality of individual laser devices 174, each individually controllable, and each of which provides a high-intensity heat source configured to generate at least one melt pool in a powdered material. In alternative embodiments, laser group 178 is an array of laser devices. In other alternative embodiments, laser group 178 is a multi-dimensional array of laser devices. Each laser device 174 is configured to emit an energy beam 108, and in the exemplary embodiment, energy beam 108 is a laser beam 164. A plurality of mirrors 136 are controlled by a plurality of actuators 138 and are configured to direct laser beams 164 towards powder bed 104. In the exemplary embodiment, plurality of actuators 138 are galvanometer-controlled motors. Laser group 178 also includes a plurality of lenses 134 positioned between laser devices 174 and powder bed 104. Lenses 134 are configured to focus energy beam 108 emitted by a respective laser device 174 on build layer 112 to form at least one melt pool 110 in powder bed 104. In alternative embodiments, the power output and the speed of each laser device 174 may be varied to produce a single melt pool 110 for each laser device 174, or a single melt pool 110 spanning all of laser devices 174, or any combination of melt pools 110 that facilitates operation of additive manufacturing system 100 as described herein. In the exemplary embodiment, plurality of lenses 134 are of the f-theta type. In alternative embodiments, laser group 178 includes laser devices that do not use coupling optics, such as lenses 134, as discussed herein.

Figure 5:
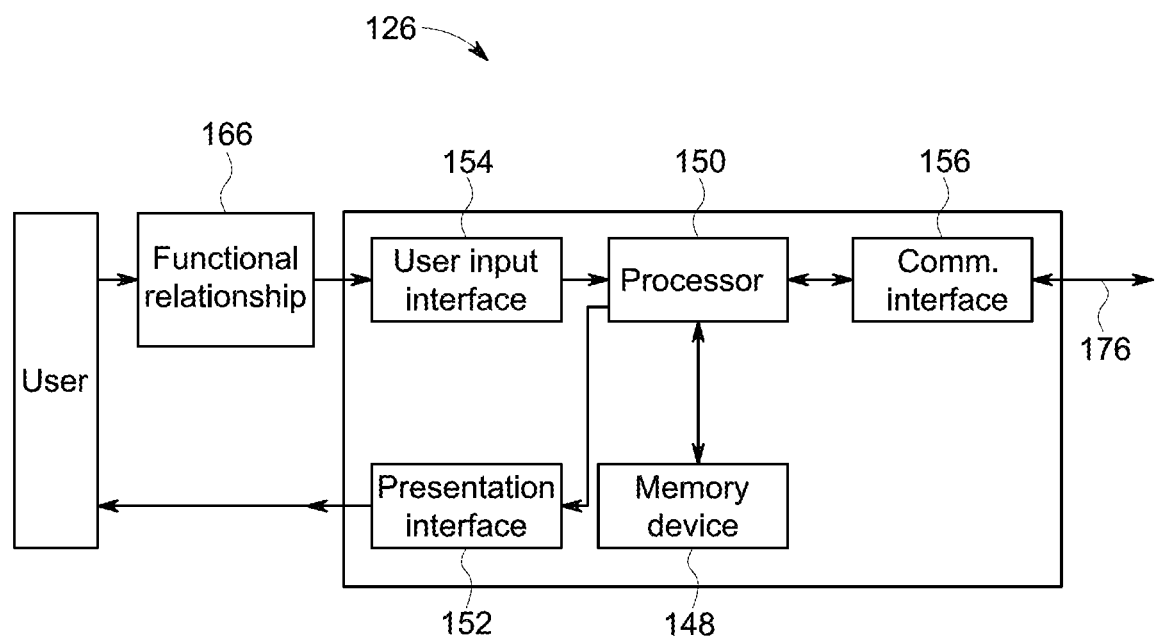
FIG. 5 is a block diagram of a controller that is used to operate the additive manufacturing system shown in FIG. 1.

FIG. 5 is a block diagram of controller 126 that is used to operate additive manufacturing system 100 (shown in FIGS. 1-3). In the exemplary embodiment, as shown in FIG. 3 and FIG. 5, controller 126 is coupled to particulate delivery system 124 and energy source 106. Further, in the exemplary embodiment, controller 126 is one of any type of controller typically provided by a manufacturer of additive manufacturing system 100 to output a control signal 176 to control operation of additive manufacturing system 100. Controller 126 executes operations to control the operation of additive manufacturing system 100 based at least partially on instructions from human operators. Controller 126 includes, for example, a 3D model of component 14 to be fabricated by additive manufacturing system 100. Operations executed by controller 126 include controlling power output of each laser device 174 in laser group 178 and controlling the scanning speed of each laser device 174 of laser group 178 within additive manufacturing system 100.

In the exemplary embodiment, controller 126 includes a memory device 148 and a processor 150 coupled to memory device 148. Processor 150 may include one or more processing units, such as, without limitation, a multi-core configuration. Processor 150 is any type of processor that permits controller 126 to operate as described herein. In some embodiments, executable instructions are stored in memory device 148. Controller 126 is configurable to perform one or more operations described herein by programming processor 150. For example, processor 150 may be programmed by encoding an operation as one or more executable instructions and providing the executable instructions in memory device 148. In the exemplary embodiment, memory device 148 is one or more devices that enable storage and retrieval of information such as executable instructions or other data. Memory device 148 may include one or more computer readable media, such as, without limitation, random access memory (RAM), dynamic RAM, static RAM, a solid-state disk, a hard disk, read-only memory (ROM), erasable programmable ROM, electrically erasable programmable ROM, or non-volatile RAM memory. The above memory types are exemplary only, and are thus not limiting as to the types of memory usable for storage of a computer program.

Memory device 148 may be configured to store any type of data, including, without limitation, build parameters associated with component 114. In some embodiments, processor 150 removes or "purges" data from memory device 148 based on the age of the data. For example, processor 150 may overwrite previously recorded and stored data associated with a subsequent time or event. In addition, or alternatively, processor 150 may remove data that exceeds a predetermined time interval. In addition, memory device 148 includes, without limitation, sufficient data, algorithms, and commands to facilitate monitoring of build parameters and the geometric conditions of component 114 being fabricated by additive manufacturing system 100.

In some embodiments, controller 126 includes a presentation interface 152 coupled to processor 150. Presentation interface 152 presents information, such as the operating conditions of additive manufacturing system 100, to a user 184. In one embodiment, presentation interface 152 includes a display adapter (not shown) coupled to a display device (not shown), such as a cathode ray tube (CRT), a liquid crystal display (LCD), an organic LED (OLED) display, or an "electronic ink" display. In some embodiments, presentation interface 152 includes one or more display devices. In addition, or alternatively, presentation interface 152 includes an audio output device (not shown), for example, without limitation, an audio adapter or a speaker (not shown).

In some embodiments, controller 126 includes a user input interface 154. In the exemplary embodiment, user input interface 154 is coupled to processor 150 and memory device 148 and receives input from user 184. User input interface 154 may include, for example, without limitation, a keyboard, a pointing device, a mouse, a stylus, a touch sensitive panel, such as, without limitation, a touch pad or a touch screen, and/or an audio input interface, such as, without limitation, a microphone. A single component, such as a touch screen, may function as both a display device of presentation interface 152 and user input interface 154.

In the exemplary embodiment, a communication interface 156 is coupled to processor 150 and is configured to be coupled in communication with one or more other devices, such as the laser devices 174 of laser group 178, and to perform input and output operations with respect to such devices while performing as an input channel. For example, communication interface 156 may include, without limitation, a wired network adapter, a wireless network adapter, a mobile telecommunications adapter, a serial communication adapter, or a parallel communication adapter. Communication interface 156 may receive a data signal from or transmit a data signal to one or more remote devices. For example, in some embodiments, communication interface 156 of controller 126 may transmit/receive a data signal to/from actuator 138.

Presentation interface 152 and communication interface 156 are both capable of providing information suitable for use with the methods described herein, such as, providing information to user 184 or processor 150. Accordingly, presentation interface 152 and communication interface 156 may be referred to as output devices. Similarly, user input interface 154 and communication interface 156 are capable of receiving information suitable for use with the methods described herein and may be referred to as input devices.

In the exemplary embodiment, memory device is configured to store at least a functional relationship algorithm 166. Functional relationship algorithm 166 is input to memory device 148 through user input interface 154 by user 184 for use by processor 150. Functional relationship algorithm 166 may include, for example, without limitation, a functional relationship between a plurality of generating path points 170 of a generating path 168 and a plurality of scan path points 182. Functional relationship algorithm 166 may be, for example, without limitation, an algorithm defining a functional relationship between a set of generating path points 170 and a plurality of scan path points 182 that is at least one of an algebraic, geometric, material and thermal relationship. Processor 150 is configured to generate at least one scan path 180 for each laser device 174 of laser group 178 using functional relationship algorithm 166.

In reference to FIG. 1, in the exemplary embodiment, energy source 106 is configured to heat particulates 128. Focused energy source 106 is optically coupled to optical elements 130 and first scanning device 118. Optical elements 130 and first scanning device 118 are configured to facilitate controlling the scanning of energy source 106. In the exemplary embodiment, energy source 106 is a laser device such as a yttrium-based solid state laser configured to emit a laser beam 164 having a wavelength of about 1070 nanometers (nm). In alternative embodiments, additive manufacturing system 100 includes any energy source 106 that facilitates operation of additive manufacturing system 100 as described herein. For example, in some embodiments, additive manufacturing system 100 includes a first energy source 106 having a first power and a second energy source 106 having a second power different from the first power. In further embodiments, additive manufacturing system 100 includes at least two energy sources 106 having substantially the same power output. In further embodiments, additive manufacturing system 100 includes at least one energy source 106 that is an electron beam generator. In some embodiments, additive manufacturing system 100 includes a diode fiber laser array (not shown) including a plurality of diode lasers and a plurality of optical fibers. In such embodiments, the diode fiber array simultaneously directs laser beams from optical fibers towards powder bed 104 to heat particulates 128.

Moreover, in the exemplary embodiment, optical elements 130 facilitate focusing beam 164 on powder bed 104. In the exemplary embodiment, optical elements 130 include a beam collimator 132 disposed between energy source 106 and first scanning device 118, and a plurality of lenses 134 disposed between first scanning device 118 and powder bed 104. In alternative embodiments, additive manufacturing system 100 includes any optical element that facilitates operation of additive manufacturing system 100 as described herein.

During operation, in the exemplary embodiment, first scanning device 118 is configured to direct beam 164 across selective portions of powder bed 104 to create a solid component 114. In the exemplary embodiment, first scanning device 118 is a galvanometer scanning device including a mirror 136 operatively coupled to a galvanometer-controlled motor 138 (broadly, an actuator). Motor 138 is configured to move (specifically, rotate) mirror 136 in response to signals received from controller 126, and thereby deflect beam 164 towards and across selective portions of powder bed 104. In some embodiments, mirror 136 includes a reflective coating that has a reflectance spectrum that corresponds to the wavelength of beam 164. In alternative embodiments, additive manufacturing system 100 includes any scanning device that facilitates operation of additive manufacturing system 100 as described herein. For example, in some embodiments, first scanning device 118 includes two mirrors and two galvanometer-controlled motors, each motor operatively coupled to one of the mirrors. In further embodiments, first scanning device 118 includes, without limitation, any of the following: two-dimension (2D) scan galvanometers, three-dimension (3D) scan galvanometers, and dynamic focusing galvanometers.

Also, in the exemplary embodiment, optical system 120 is configured to facilitate monitoring at least one melt pool 110 created by beam 164. In particular, optical system 120 is configured to detect electromagnetic radiation generated by each melt pool 110 and transmit information about each melt pool 110 to controller 126. More specifically, optical system 120 is configured to receive EM radiation generated by each melt pool 110, and generate an electrical signal in response thereto. Optical system 120 is communicatively coupled to controller 126, and is configured to transmit electrical signals to controller 126. In alternative embodiments, additive manufacturing system 100 includes any optical system 120 that facilitates operation of additive manufacturing system 100 as described herein. For example, in some embodiments, optical system 120 includes, without limitation, any of the following: a photomultiplier tube, a photodiode, an infrared camera, a charged-couple device (CCD) camera, a CMOS camera, a pyrometer, or a high-speed visible-light camera. In further embodiments, optical system 120 is configured to detect EM radiation within an infrared spectrum and EM radiation within a visible-light spectrum. In some embodiments, optical system 120 includes a beam splitter (not shown) configured to divide and deflect EM radiation from each melt pool 110 to corresponding optical detectors.

While optical system 120 is described as including "optical" detectors for EM radiation generated by each melt pool 110, it should be noted that use of the term "optical" is not equated with the term "visible." Rather, optical system 120 is configured to capture a wide spectral range of EM radiation. For example, in some embodiments, optical system 120 is sensitive to light with wavelengths in the ultraviolet spectrum (about 200-400 nm), the visible spectrum (about 400-700 nm), the near-infrared spectrum (about 700-1,200 nm), and the infrared spectrum (about 1,200-10,000 nm). Further, because the type of EM radiation emitted by each melt pool 110 depends on the temperature of each melt pool 110, optical system 120 is capable of monitoring and measuring both a size and a temperature of each melt pool 110.

Also in the exemplary embodiment, optical system 120 includes second scanning device 158 which is configured to direct EM radiation generated by each melt pool 110. In the exemplary embodiment, second scanning device 158 is a galvanometer scanning device including a first mirror 140 operatively coupled to a first galvanometer-controlled motor 142 (broadly, an actuator), and a second mirror 144 operatively coupled to a second galvanometer-controlled motor 146 (broadly, an actuator). First motor 142 and second motor 146 are configured to move (specifically, rotate) first mirror 140 and second mirror 144, respectively, in response to signals received from controller 126 to deflect EM radiation from each melt pool 110 to optical system 120. In some embodiments, one or both of first mirror 140 and second mirror 144 includes a reflective coating that has a reflectance spectrum that corresponds to EM radiation that optical system 120 is configured to detect. In alternative embodiments, additive manufacturing system 100 includes any scanning device that facilitates operation of additive manufacturing system 100 as described herein.

Additive manufacturing system 100 is operated to fabricate a component 114 by a layer-by-layer manufacturing process. Component 114 is fabricated from an electronic representation of the 3D geometry of the component 114. In some embodiments, the electronic representation is produced in a computer aided design (CAD) or similar file. In alternative embodiments, the electronic representation is any electronic representation that facilitates operation of additive manufacturing system 100 as described herein. In the exemplary embodiment, the CAD file of component 114 is converted into a layer-by-layer format that includes a plurality of build parameters for each build layer 112. In the exemplary embodiment, component 114 is arranged electronically in a desired orientation relative to the origin of the coordinate system used in additive manufacturing system 100. The geometry of component 114 is sliced into a stack of build layers 112 of a desired thickness, such that the geometry of each build layer 112 is an outline of the cross-section through component 114 at that particular build layer 112 location.

In the exemplary embodiment, once the build layers 112 of component 114 have been generated, at least one generating path 168 is applied across each build layer 112. Each generating path 168 may be a curved line, a straight line, or of any geometry that facilitates operation of additive manufacturing system 100 as described herein. A plurality of generating path points 170 in a fixed relative location to each other are swept along generating path 168 to define a generating path points path (GPPP) 172. GPPP 172 may be defined by constraining at least one of generating path points 170 such that the at least one generating path point 170 lies on generating path 168 while the remainder of plurality of generating path points 170 are swept along generating path 168. Plurality of generating path points 170 may rotate as they are swept along generating path 168 to define GPPP 172, and plurality of generating path points 170 may maintain a constant orientation relative to generating path 168. In an alternative embodiment, each scan path is generated directly from a functional relationship with the generating path, without the need for generating path points. Once the process is completed for each build layer 112, an electronic computer build file (or files) is generated including all of build layers 112, generating paths 168, generating points 170, and GPPP 172. The file including all of build layers 112, generating paths 168, generating points 170, and GPPP 172 then is loaded into controller 126 of additive manufacturing system 100.

In an alternative embodiment, once the build layers 112 of component 114 have been generated, at least one generating path 168 is applied across each build layer 112. Each generating path 168 may be a curved line, a straight line, or of any geometry that facilitates operation of additive manufacturing system 100 as described herein. Using functional relationship 166, a plurality of scan paths 180 corresponding to each individual laser device 174 are generated from generating path 168 and are applied across each build layer 112. Once the process is completed for each build layer 112, an electronic computer build file (or files) is generated including all of build layers 112, generating paths 168, and scan paths 180. The file including all of build layers 112, generating paths 168, and scan paths 180 then is loaded into controller 126 of additive manufacturing system 100. In another embodiment, a series of sequential scan paths 180 are precomputed with the same scan geometry encoded as a series of concurrent scan paths 180. In alternative embodiments, build layers 112 and scan paths 180 are generated in any suitable manner that enables additive manufacturing system 100 to function as described herein.

In the exemplary embodiment, after the build file and functional relationship algorithm 166 are loaded into controller 126, additive manufacturing system 100 is operated to generate component 114 by implementing the layer-by-layer manufacturing process, such as a DMLM method. The build parameters are applied along at least one generating path 168 to fabricate build layer 112 of component 114 from the material used to construct component 114. In the exemplary embodiment, controller 126 may generate non-uniform output intensity profile 186 and simultaneously regulate or control a signal 176 to each individual laser device 174 to control the power output of each laser device 174. The power output of each laser device 174 is based in part, on the absolute position of each laser device 174 as it moves across powder bed 104, each laser device 174 following its respective scan path. The steps are repeated for each respective build layer 112 of component 114. The exemplary layer-by-layer additive manufacturing process does not use a pre-existing article as the precursor to final component 114, rather the process produces component 114 from a raw material in a configurable form, such as particulates 128. For example, without limitation, a steel component 114 is additively manufactured using a steel powder. Additive manufacturing system 100 facilitates fabrication of components 114 using a broad range of materials, for example, without limitation, metals, ceramics, and polymers. In alternative embodiments, DMLM fabricates components 114 from any materials that facilitate operation of additive manufacturing system 100 as described herein.

As used herein, the term "parameter" refers to characteristics that are used to define the operating conditions of additive manufacturing system 100, such as a power output of energy source 106, spacing between scan paths 180, and a scan path 180 scanning speed of energy source 106 within additive manufacturing system 100. In the exemplary embodiment, a user inputs several of the parameters into controller 126 via user input interface 154. In another embodiment, the parameters are read from a file by controller 126. In alternative embodiments, parameters may be input to, or read from, any portion of additive manufacturing system 100 that facilitates operation of additive manufacturing system 100 as described herein.

Figure 6:
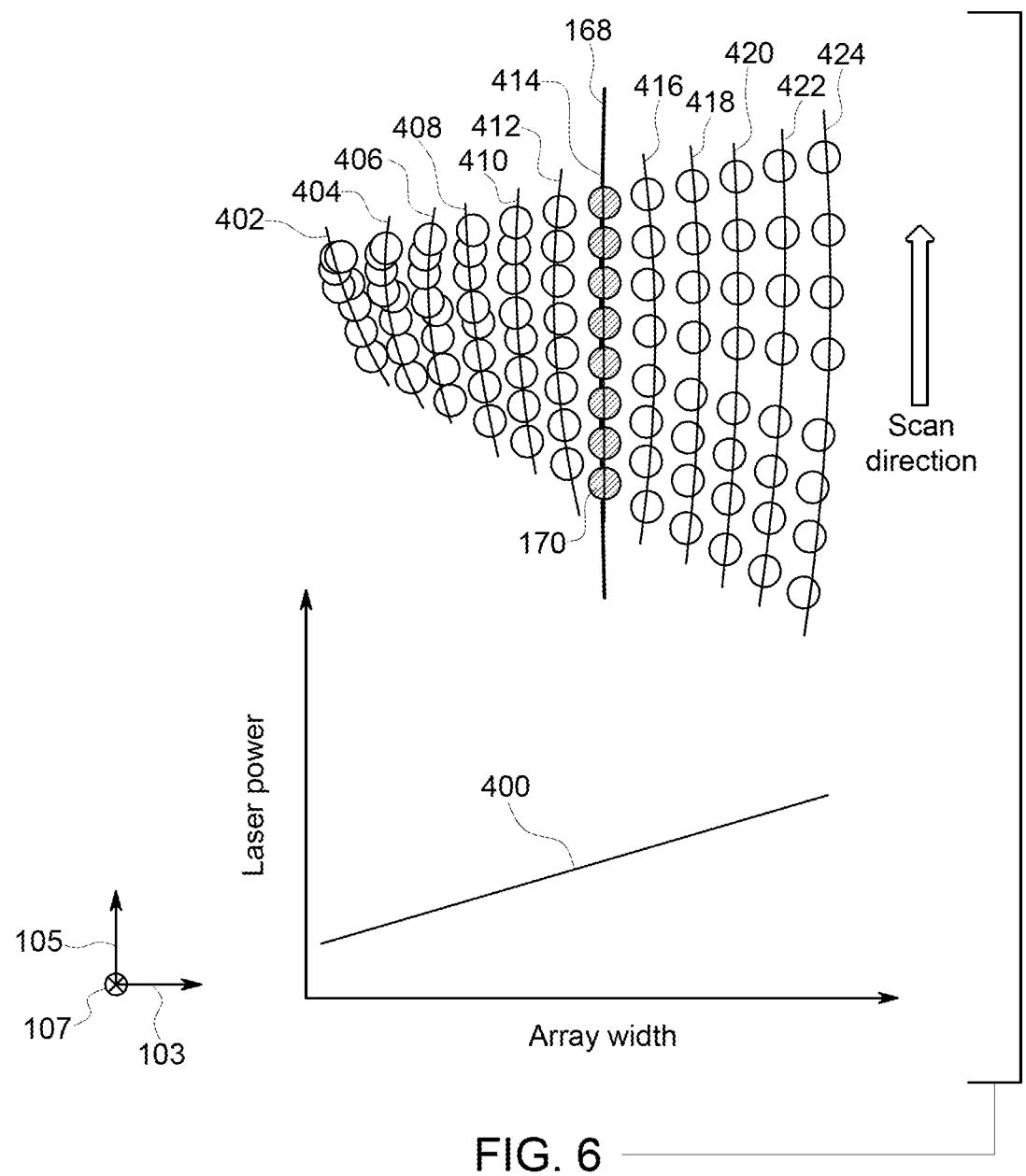
FIG. 6 is a schematic diagram of one embodiment of the scan paths and non-uniform energy intensity profile emitted by the laser group of the additive manufacturing system shown in FIG. 1.

FIG. 6 is a schematic diagram of a non-uniform energy intensity profile 400 emitted by laser group 178 (shown in FIG. 4). In the exemplary embodiment, laser group 178 includes 12 individual laser devices 174 (shown in FIG. 3) each following a scan path, and in particular, laser device scan paths 402, 404, 406, 408, 410, 412, 414, 416, 418, 420, 422, and 424 linearly arranged. In some embodiments, laser group 178 includes any number of laser devices 174, and corresponding scan paths, that enables laser group 178 to function as described herein. In addition, in some embodiments, laser device scan paths 402, 404, 406, 408, 410, 412, 414, 416, 418, 420, 422, and 424, illustrated in FIG. 6 represent a selected subset of adjacent scan paths of laser devices 174 of laser group 178. That is, one or more additional laser devices 174 are arranged about the laser devices following scan paths 402, 404, 406, 408, 410, 412, 414, 416, 418, 420, 422, and 424 for example, in a continued linear arrangement.

In the exemplary embodiment, controller 126 (shown in FIGS. 3, 5) simultaneously regulates signals 176 to each individual laser device 174 to control non-uniform output intensity profile 400, based in part, on the absolute position of each laser device 174 as it moves across powder bed 104, each laser device 174 following its respective scan path 402, 404, 406, 408, 410, 412, 414, 416, 418, 420, 422, and 424. As described above, plurality of scan path points 182 and scan paths 402-424 are generated from plurality of generating scan path points 170 and generating scan path 168 using functional relationship algorithm 166 input to controller 126. In the exemplary embodiment, all of generating path points 170 lie on generating scan path 168.

Scan paths 402-424 are each defined by unique curvatures generated by functional relationship algorithm 166. In the exemplary embodiment, laser devices 174 following scan paths 402-424 are driven by controller 126 to output increasingly more energy along their respective scan paths, ranging from the lowest energy output for laser device 174 following scan path 402, to the highest energy output for laser device 174 following scan path 424. Laser devices 174 following scan paths 402-424 have increasingly greater power outputs to facilitate reducing excess heating of the powder on powder bed 104 and generating a melt pool characteristic such as a generally flat depth profile in relation to the geometry of the underlying component 114 or scan path 180. In the exemplary embodiment, the spacing of a plurality of scan path points 182 along their respective scan paths 402-424 is representative of the speed at which each laser device 174 is moving along its respective scan path. The more rapid the rate of travel of laser device 174, the higher the power output must be to maintain equal relative heating rates between all laser devices 174. Additionally, laser devices 174 following scan paths 402-422 may have individually decreased or increased power outputs along their respective scan paths 402-424 to facilitate generating or modifying at least one physical characteristic of the underlying component 114, such as desired grain structure, surface finish, and hardness, among others. In alternative embodiments, non-uniform energy intensity profile 400 may have any energy intensity profile and any number of scan paths that facilitate operation of additive manufacturing system as described herein.

Figure 7:
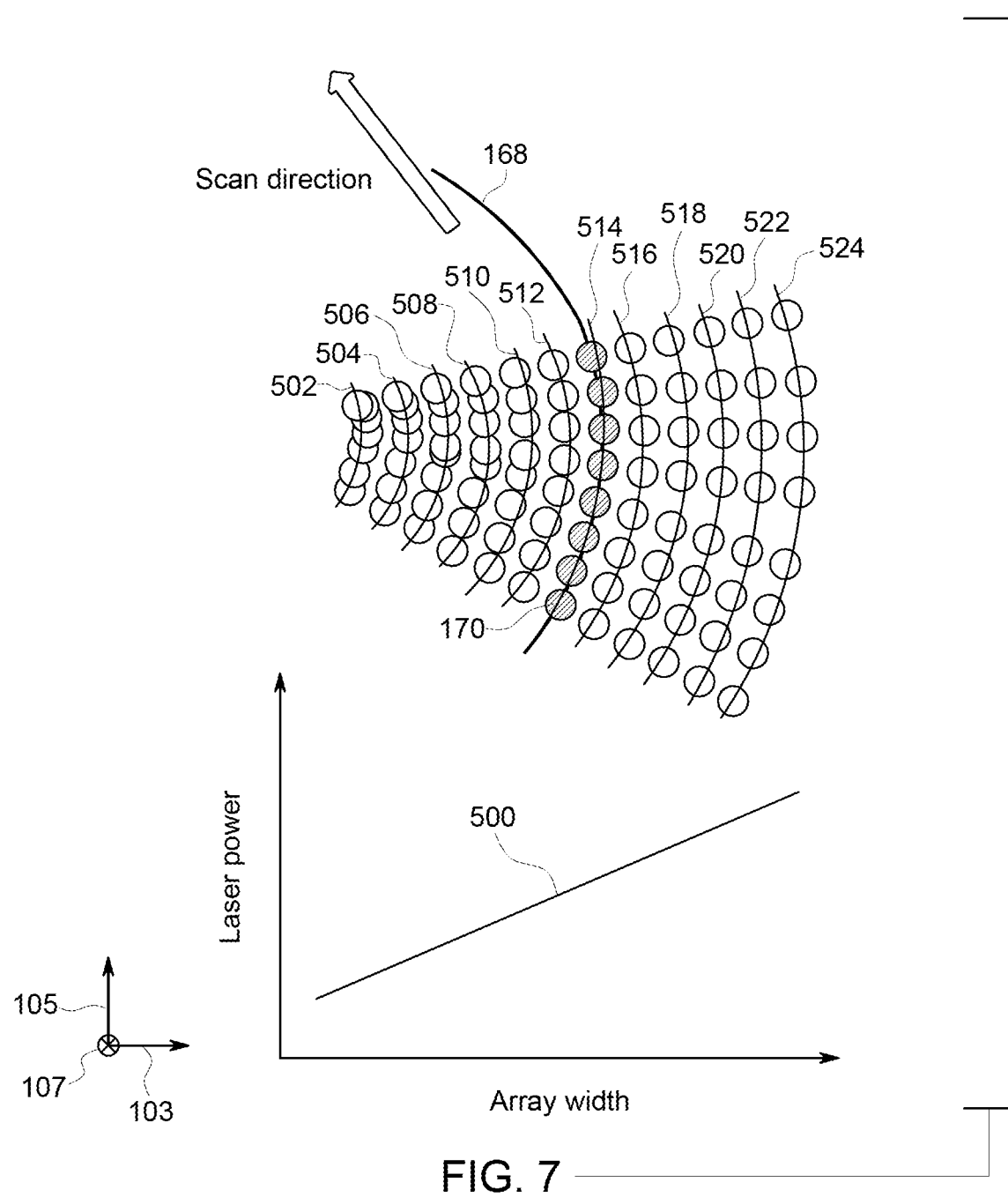
FIG. 7 is a schematic diagram of an alternative embodiment of the scan paths and non-uniform energy intensity profile emitted by the laser group of the additive manufacturing system shown in FIG. 1.

FIG. 7 is a schematic diagram of an alternative non-uniform energy intensity profile 500 emitted by laser group 178 (shown in FIG. 4). In the exemplary embodiment, laser group 178 includes 12 individual laser devices 174 (shown in FIG. 3) each following a scan path, and in particular, laser device scan paths 502, 504, 506, 508, 510, 512, 514, 516, 518, 520, 522, and 524 linearly arranged. In some embodiments, laser group 178 includes any number of laser devices 174, and corresponding scan paths, that enables laser group 178 to function as described herein. In addition, in some embodiments, laser device scan paths 502, 504, 506, 508, 510, 512, 514, 516, 518, 520, 522, and 524, illustrated in FIG. 7 represent a selected subset of adjacent scan paths of laser devices 174 of laser group 178. That is, one or more additional laser devices 174 are arranged about the laser devices following scan paths 502, 504, 506, 508, 510, 512, 514, 516, 518, 520, 522, and 524 for example, in a continued linear arrangement.

In the exemplary embodiment, controller 126 (shown in FIGS. 3, 5) simultaneously regulates or controls signals 176 to each individual laser device 174 to control non-uniform output intensity profile 500, based in part, on the absolute position of each laser device 174 as it moves across powder bed 104, each laser device 174 following its respective scan path 502, 504, 506, 508, 510, 512, 514, 516, 518, 520, 522, and 524. As described above, plurality of scan path points 182 and scan paths 502-524 are generated from plurality of generating scan path points 170 and generating scan path 168 using functional relationship algorithm 166 input to controller 126. In the exemplary embodiment, scan paths 502-524 generated by functional relationship algorithm 166 share a direction of curvature and are configured as nested adjacent curves. Laser devices 174 following scan paths 502-524 are driven by controller 126 to output increasingly more energy along their respective scan paths, ranging from the lowest energy output for laser device 174 following scan path 502, to the highest energy output for laser device 174 following scan path 524. Laser devices 174 following scan paths 502-524 have increasingly greater power outputs to facilitate reducing excess heating of the powder on powder bed 204 and generating a melt pool characteristic such as a generally flat depth profile in relation to the geometry of the underlying component 114 or scan path 180.

In the exemplary embodiment, the spacing of plurality of scan path points 182 along their respective scan paths 502-524 is representative of the speed at which each laser device 174 is moving along its respective scan path—the more rapid the rate of travel of laser device 174, the higher the power output must be to maintain equal relative heating rates between all laser devices 174. Additionally, laser devices 174 following scan paths 502-524 may have individually decreased or increased power outputs along their respective scan paths 502-524 to facilitate generating or modifying at least one physical characteristic of the underlying component 114, such as desired grain structure, surface finish, and hardness, among others. In alternative embodiments, non-uniform energy intensity profile 500 may have any energy intensity profile and any number of scan paths that facilitate operation of additive manufacturing system as described herein.

Figure 8:
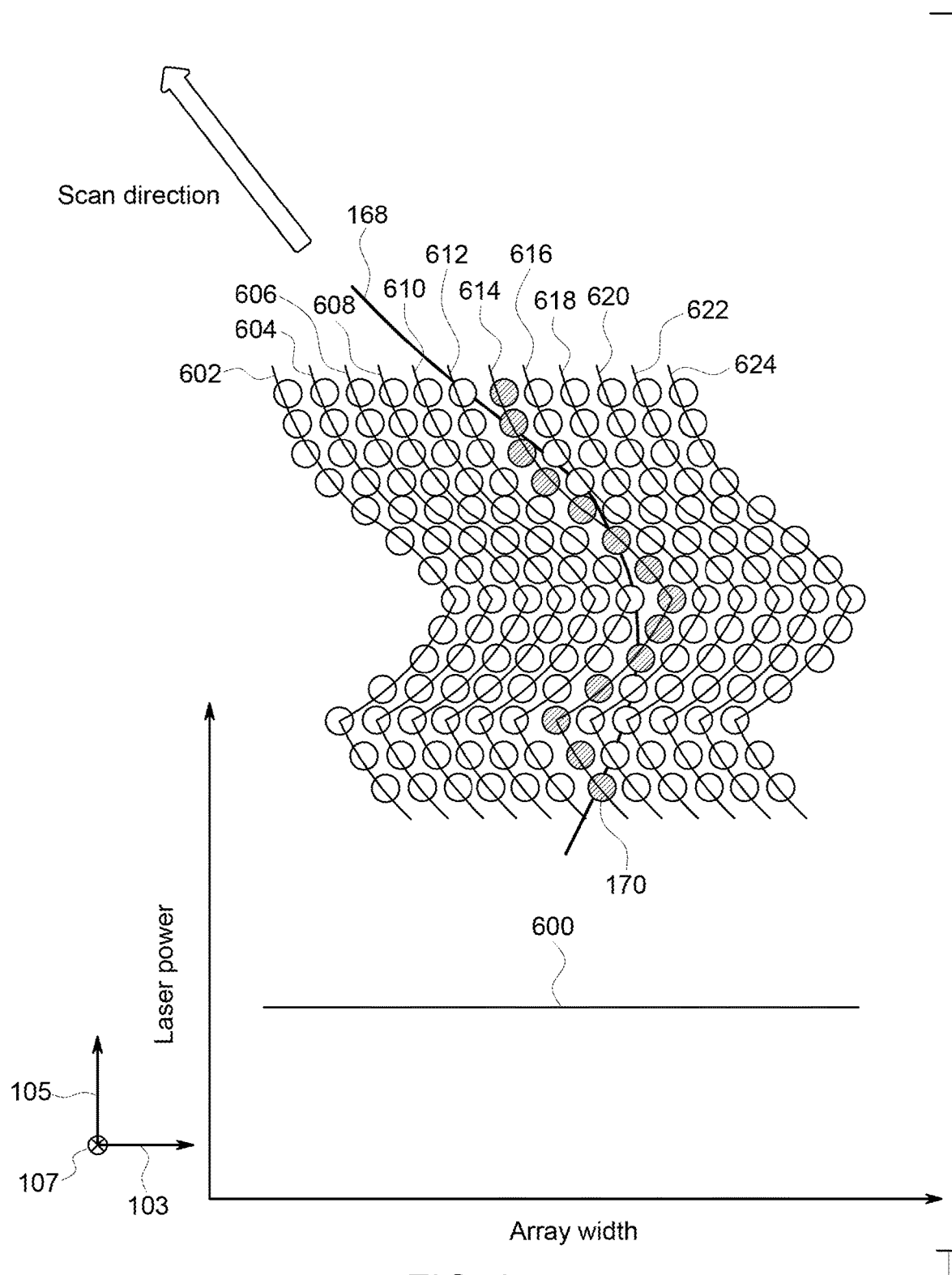
FIG. 8 is a schematic diagram of another alternative embodiment of the scan paths and non-uniform energy intensity profile emitted by the laser group of the additive manufacturing system shown in FIG. 1.

FIG. 8 is a schematic diagram of another alternative non-uniform energy intensity profile 600 emitted by laser group 178 (shown in FIG. 4). In the exemplary embodiment, laser group 178 includes 12 individual laser devices 174 (shown in FIG. 3) each following a scan path, and in particular, laser device scan paths 602, 604, 606, 608, 610, 612, 614, 616, 618, 620, 622, and 624 linearly arranged. In some embodiments, laser group 178 includes any number of laser devices 174, and corresponding scan paths, that enables laser group 178 to function as described herein. In addition, in some embodiments, laser device scan paths 602, 604, 606, 608, 610, 612, 614, 616, 618, 620, 622, and 624, illustrated in FIG. 8 represent a selected subset of adjacent scan paths of laser devices 174 of laser group 178. That is, one or more additional laser devices 174 are arranged about the laser devices following scan paths 602, 604, 606, 608, 610, 612, 614, 616, 618, 620, 622, and 624 for example, in a continued linear arrangement.

In the exemplary embodiment, controller 126 (shown in FIGS. 3, 5) simultaneously regulates or controls signals 176 to each individual laser device 174 to control non-uniform output intensity profile 600, based in part, on the absolute position of each laser device 174 as it moves across powder bed 104, each laser device 174 following its respective scan path 602, 604, 606, 608, 610, 612, 614, 616, 618, 620, 622, and 624. As described above, plurality of scan path points 182 and scan paths 602-624 are generated from plurality of generating scan path points 170 and generating scan path 168 using functional relationship algorithm 166 input to controller 126. In the exemplary embodiment, only a portion of generating path points 170 lie on the generating scan path 168. Scan paths 602-624 generated by functional relationship algorithm 166 are substantially identical curves nested adjacent to each other in the transverse dimension 103. Laser devices 174 following scan paths 602-624 are driven by controller 126 to output increasingly more energy along their respective scan paths, ranging from the lowest energy output for laser device 174 following scan path 602, to the highest energy output for laser device 174 following scan path 624. Laser devices 174 following scan paths 602-624 have increasingly greater power outputs to facilitate reducing excess heating of the powder on powder bed 204 and generating a melt pool characteristic such as a generally flat depth profile in relation to the geometry of the underlying component 114 or scan path 180.

In the exemplary embodiment, the spacing of plurality of scan path points 182 along their respective scan paths 602-624 is representative of the speed at which each laser device 174 is moving along its respective scan path—the more rapid the rate of travel of laser device 174, the higher the power output must be to maintain equal relative heating rates between all laser devices 174. Additionally, laser devices 174 following scan paths 602-624 may have individually decreased or increased power outputs along their respective scan paths 602-624 to facilitate generating or modifying at least one physical characteristic of the underlying component 114, such as desired grain structure, surface finish, and hardness, among others. In alternative embodiments, non-uniform energy intensity profile 600 may have any energy intensity profile and any number of scan paths that facilitate operation of additive manufacturing system as described herein.

Figure 9:
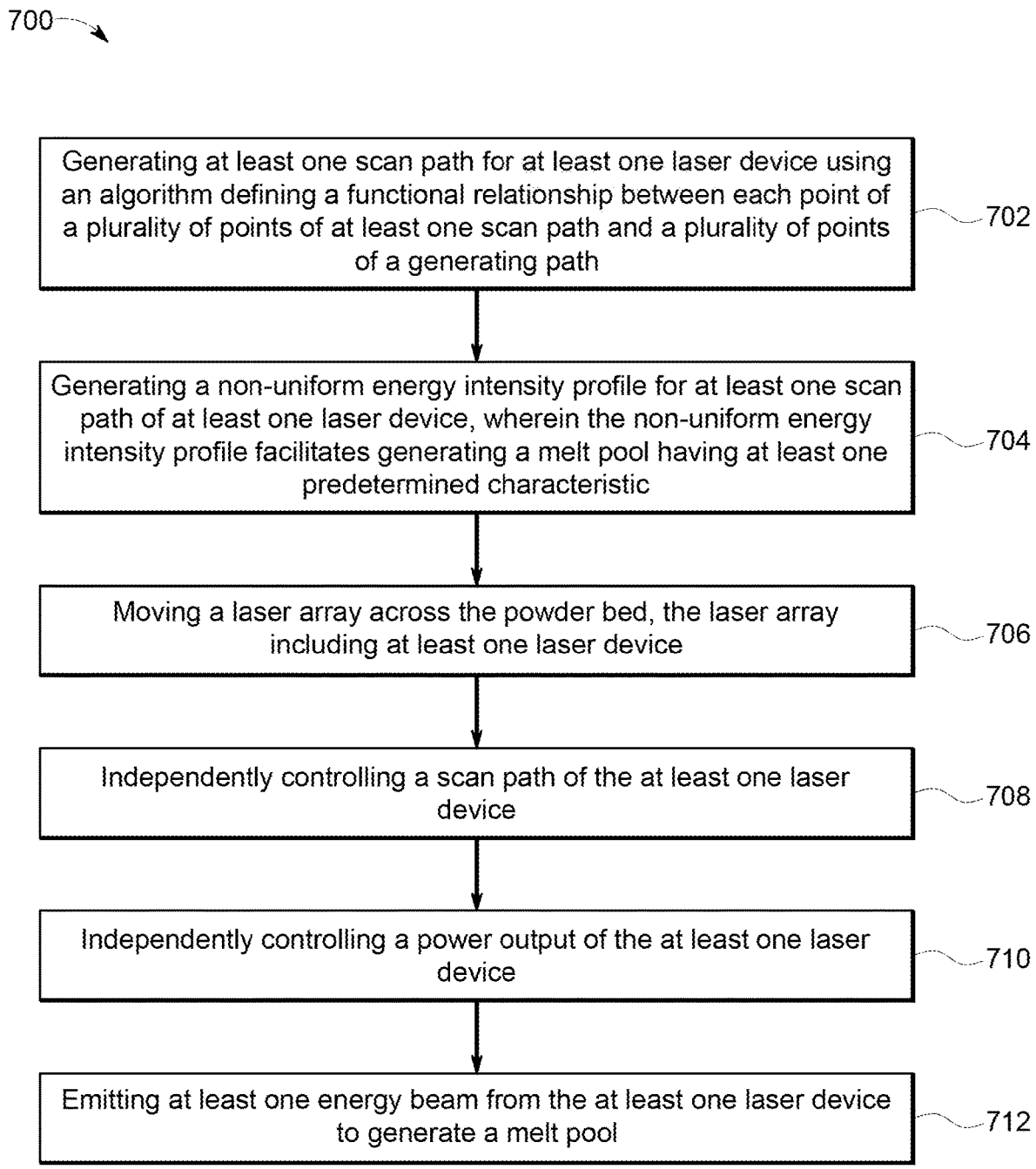
FIG. 9 is a flow diagram illustrating exemplary steps of the exemplary method of fabricating a component using the additive manufacturing system shown in FIGS. 1-3.

FIG. 9 is a flow diagram illustrating the exemplary method 700 of fabricating a component 114 (shown in FIGS. 1-3). Method 700 includes generating 702 at least one scan path 180 for at least one laser device 174 using an algorithm defining a functional relationship 166 between each point 182 of a plurality of points 182 of at least one scan path 180 and a plurality of points 170 of a generating path 172.

Once at least one scan path 180 has been generated, generating 704 a non-uniform energy intensity profile 186 for at least one scan path 180 of at least one laser device 174, where the non-uniform energy intensity profile 186 facilitates generating at least one melt pool 110 having at least one predetermined characteristic is completed.

Also, once a non-uniform energy intensity profile 186 has been generated, moving 706 a laser group 178, the laser group 178 including at least one laser device 174, across the powder bed 104 is completed. Further, once laser group 178 has been moved across powder bed 104, independently 708 controlling a scan path 180 of the at least one laser device 174 is completed. Once a scan path 180 of at least one laser device 174 has been controlled, independently 710 controlling a power output of the at least one laser device 174 is completed. Further, once the power output of the at least one laser device 174 is independently controlled, emitting 712 at least one energy beam 108 from the at least one laser device 174 to generate at least one melt pool 110 is completed.

Embodiments of the additive manufacturing systems with controllers and groups of at least one laser device described herein enable the generation of functionally related scan paths for each independent laser device of a group of lasers and control of each independent laser device independently, according to the properties of the component being fabricated. Generating scan paths using an algorithm defining a functional relationship for individually controllable laser devices facilitates rapid and efficient scan path generation without constraining the scan paths to a particular type of path, such as raster, vector, or straight line, among others. For comparison, in general, during raster scanning, an energy beam is scanned sequentially along a series of substantially straight lines spaced apart and parallel to each other. During vector scanning, an energy beam is generally scanned sequentially along a series of substantially straight lines or vectors, where the orientation of the vectors relative to each other sometimes varies. In general, the ending point of one vector coincides with the beginning point of the next vector. Vector scanning is generally used to define the outer contours of a component, whereas raster scanning is generally used to "fill" the spaces enclosed by the contour, where a component is solid. Scan paths generated from a functional relationship with a common set of generating points avoid the limitations of both raster and vector scanning by allowing the laser devices to follow paths that are as linear and curvilinear as facilitates more rapid construction of a component.

Moreover, control of the power output of the individual laser devices facilitates tailoring a non-uniform output intensity profile across the functionally related scan paths to form preferential melt pool characteristics, such as consistent melting depth. The individual control of the individual laser devices accounts for variations in heating between the laser devices being used to process material at the edge of the group of laser devices compared to the laser devices located in the central region of the group of laser devices, where thermal losses may be substantially different, or where the laser devices may be moving more slowly than the laser devices at the edge of the group of laser devices. As such, the group of laser devices can generate an optimized melt pool profile for building in specific geometries as well as hatching large areas simultaneously. A preferential shallow, wide melt pool can be formed by adjusting the energy output of each laser device of the group of laser devices. This facilitates reducing manufacturing time of a component, facilitating reduced manufacturing costs.

An exemplary technical effect of the methods and systems described herein includes at least one of: (a) using an algorithm defining a functional relationship to generate scan paths for at least one laser device; (b) reducing the amount of memory needed to store at least one scan path for at least one laser device; (c) generating a laser device non-uniform energy intensity profile by varying the power output of each laser device of a group of lasers; (d) reducing build time of a component; and e) reducing the cost to manufacture the component.

Exemplary embodiments of additive manufacturing systems including a controller and at least one laser device are described above in detail. The apparatus, systems, and methods are not limited to the specific embodiments described herein, but rather, operations of the methods and components of the systems may be utilized independently and separately from other operations or components described herein. For example, the systems, methods, and apparatus described herein may have other industrial or consumer applications and are not limited to practice with components as described herein. Rather, one or more embodiments may be implemented and utilized in connection with other industries.

Although specific features of various embodiments of the technology may be shown in some drawings and not in others, this is for convenience only. In accordance with the principles of the invention, any feature of a drawing may be referenced or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments of the present disclosure, including the best mode, and also to enable any person skilled in the art to practice embodiments of the present disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A controller for use in an additive manufacturing system including a laser array having at least two laser devices, the at least two laser devices configured to generate at least one melt pool in a layer of powdered material, said controller comprising a processing device and a memory device coupled to said processing device, said controller configured to:
generate at least one control signal for each of the at least two laser devices to control a power output throughout at least one scan path of each of the at least two laser devices across the layer of powdered material, each of the at least one scan paths generated at least partially based on at least one algorithm defining a functional relationship between a plurality of points of a generating path and each point of a plurality of points of the at least one scan path, wherein the generating path is a single generating path for generating each of the at least one scan paths for each of the at least two lasers for a particular layer;
generate a non-uniform energy intensity profile between each scan path of the laser array, wherein said non-uniform energy intensity profile facilitates generating the at least one melt pool having at least one predetermined characteristic; and
transmit each of the at least one control signals and the non-uniformity energy intensity profile to the at least two laser devices to emit at least one laser beam from each of the at least two laser devices to generate the at least one melt pool.

2. The controller in accordance with claim 1, wherein the functional relationship is defined through at least one of an algebraic, geometric, material, and thermal relationship between the plurality of points of the generating path and each point of the plurality of points of the at least one scan path.

3. The controller in accordance with claim 1, wherein the laser array includes at least three laser devices.

4. The controller in accordance with claim 1, wherein all of the generating path points lie on the generating path.

5. The controller in accordance with claim 1, wherein at least one of the generating path points lies on the generating path.

6. An additive manufacturing system comprising:
a laser array comprising at least two laser devices configured to generate at least one melt pool in a layer of powdered material;
an actuator system configured to move said at least two laser devices across the layer of powdered material; and
a controller configured to:
generate at least one control signal for each of said at least two laser devices to control a power output throughout at least one scan path of each of said at least two laser devices across the layer of powdered material, each of the at least one scan paths generated at least partially based on at least one algorithm defining a functional relationship between a plurality of points of a generating path and each point of a plurality of points of the at least one scan path, wherein the generating path is a single generating path for generating each of the at least one scan paths for each of the at least two lasers for a particular layer;
generate a non-uniform energy intensity profile between each scan path of said laser array, wherein said non-uniform energy intensity profile facilitates generating the at least one melt pool having at least one predetermined characteristic; and
transmit each of the at least one control signals and the non-uniformity energy intensity profile to said at least two laser devices to emit at least one laser beam from each of said at least two laser devices to generate the at least one melt pool.

7. The additive manufacturing system of claim 6, wherein the functional relationship is defined through at least one of an algebraic, geometric, material, and thermal relationship between the plurality of points of the generating path and each point of the plurality of points of the at least one scan path.

8. The additive manufacturing system of claim 6, said laser array comprising at least three laser devices.

9. The additive manufacturing system of claim 6, wherein all of the generating path points lie on the generating path.

10. The additive manufacturing system of claim 6, wherein at least one of the generating path points lies on the generating path.

11. A method of fabricating a component in a powder bed, said method comprising:
generating at least one scan path for each of at least two laser devices in a laser array, each of the at least one scan paths generated at least partially based on at least one algorithm defining a functional relationship between each point of a plurality of points of each of the at least one scan path and a plurality of points of a generating path, wherein the generating path is a single generating path for generating each of the at least one scan paths for each of the at least two lasers for a particular layer;

generating a non-uniform energy intensity profile between each scan path of the laser array, wherein the non-uniform energy intensity profile facilitates generating at least one melt pool having at least one predetermined characteristic;

moving the at least two laser devices across the powder bed;

controlling the scan paths of each of the at least two laser devices;

controlling a power output of each of the at least two laser devices based on each of the generated non-uniformity energy intensity profile; and emitting at least one energy beam from each of the at least two laser devices to generate the at least one melt pool.

12. The method in accordance with claim 11, wherein moving the at least two laser devices across the powder bed comprises moving the at least two laser devices relative to the powder bed.

13. The method in accordance with claim 11, wherein moving the at least two laser devices across the powder bed comprises moving the powder bed relative to the at least two laser devices.

14. The method in accordance with claim 11, wherein the functional relationship is defined through at least one of an algebraic, geometric, material, and thermal relationship between the plurality of points of the generating path and each point of the plurality of points of each of the at least one scan paths.

15. The method in accordance with claim 11, wherein the laser array comprises at least three laser devices.

16. The controller in accordance with claim 3, wherein the laser array includes a first laser device, a second laser device, and a third laser device arranged linearly from a first end to a second end, wherein said controller is further configured to generate at least one control signal for each of the first, second, and third laser devices to control a power output throughout one scan path of each of the first, second, and third laser devices across the layer of powdered material, and wherein each of the at least one control signals is configured to increase the power output across the first, second, and third laser devices from the first end to the second end.

17. The controller in accordance with claim 16, wherein the at least one scan path for the first laser device at the first end includes a plurality of first scan path points that are closer to together than a plurality of third scan path points in the at least one scan path for the third laser device at the second end.

18. The additive manufacturing system of claim 8, wherein said laser array comprises a first laser device, a second laser device, and a third laser device arranged linearly from a first end to a second end, wherein said controller is further configured to generate at least one control signal for each of said first, second, and third laser devices to control a power output throughout one scan path of each of said first, second, and third laser devices across the layer of powdered material, and wherein each of the at least one control signals is configured to increase the power output across said first, second, and third laser devices from the first end to the second end.

19. The additive manufacturing system in accordance with claim 18, wherein the at least one scan path for said first laser device at the first end includes a plurality of first scan path points that are closer to together than a plurality of third scan path points in the at least one scan path for said third laser device at the second end.

20. The method in accordance with claim 15, wherein the laser array includes a first laser device, a second laser device, and a third laser device arranged linearly from a first end to a second end, wherein controlling a power output of each of the at least two laser devices based on each of the generated non-uniformity energy intensity profile further comprises controlling the power output of each of the first, second, and third laser devices such that the power output is configured to increase across the first, second, and third laser devices from the first end to the second end.

* * * * *